United States Patent [19]
Bogut et al.

[11] Patent Number: 5,927,342
[45] Date of Patent: Jul. 27, 1999

[54] FIRE HOSE INCLUDING AN INTEGRAL RADIATING ANTENNA

[75] Inventors: Henry A. Bogut, Coral Springs; Louis F. Abramczyk, Sunrise; Lawrence A. Myers, Pompano Beach, all of Fla.

[73] Assignee: Motorola, Inc., Schaumburg, Ill.

[21] Appl. No.: 08/996,902

[22] Filed: Dec. 23, 1997

[51] Int. Cl.⁶ .................................................. F16L 55/00
[52] U.S. Cl. ...................... 138/103; 138/104; 138/127; 138/138; 138/153; 343/702; 343/720
[58] Field of Search ................................. 138/103, 104, 138/127, 138, 153; 343/702, 720, 841, 873, 904, 905

[56] References Cited

U.S. PATENT DOCUMENTS

| | | | |
|---|---|---|---|
| H1057 | 5/1992 | Regalia et al. | 138/103 |
| 2,683,466 | 7/1954 | Guiles | 138/138 |
| 3,189,053 | 6/1965 | Parr | 138/138 |
| 4,467,837 | 8/1984 | Baker | 138/137 |
| 4,808,767 | 2/1989 | Colbachini | 138/103 |
| 5,182,147 | 1/1993 | Davis | 138/153 |
| 5,349,362 | 9/1994 | Forbes et al. | 343/720 |
| 5,551,484 | 9/1996 | Charboneau | 138/104 |

*Primary Examiner*—Denise L. Ferensic
*Assistant Examiner*—James F. Hook
*Attorney, Agent, or Firm*—Frank M. Scutch, III

[57] ABSTRACT

A fire hose (100) includes one or more conductors (107) acting as a feed line that is integrally woven into the fire hose side wall (109) and extending at least partially along a predetermined length of hose. One or more slots (113) expose the conductor (107) for transmitting and receiving radio frequency (RF) energy. The RF energy is transmitted and received bi-directionally along into the conductor (107) along the length of the fire hose. This provides stations positioned along the fire hose to have enhanced two-way radio communication without the disadvantage of signal degradation due to a firefighter's location within a building.

7 Claims, 3 Drawing Sheets

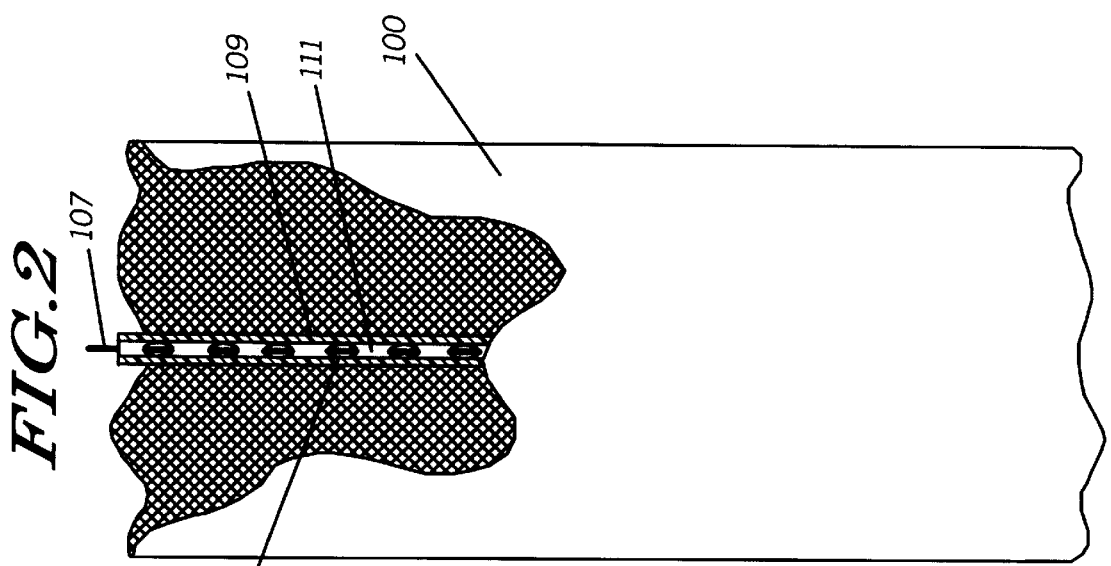
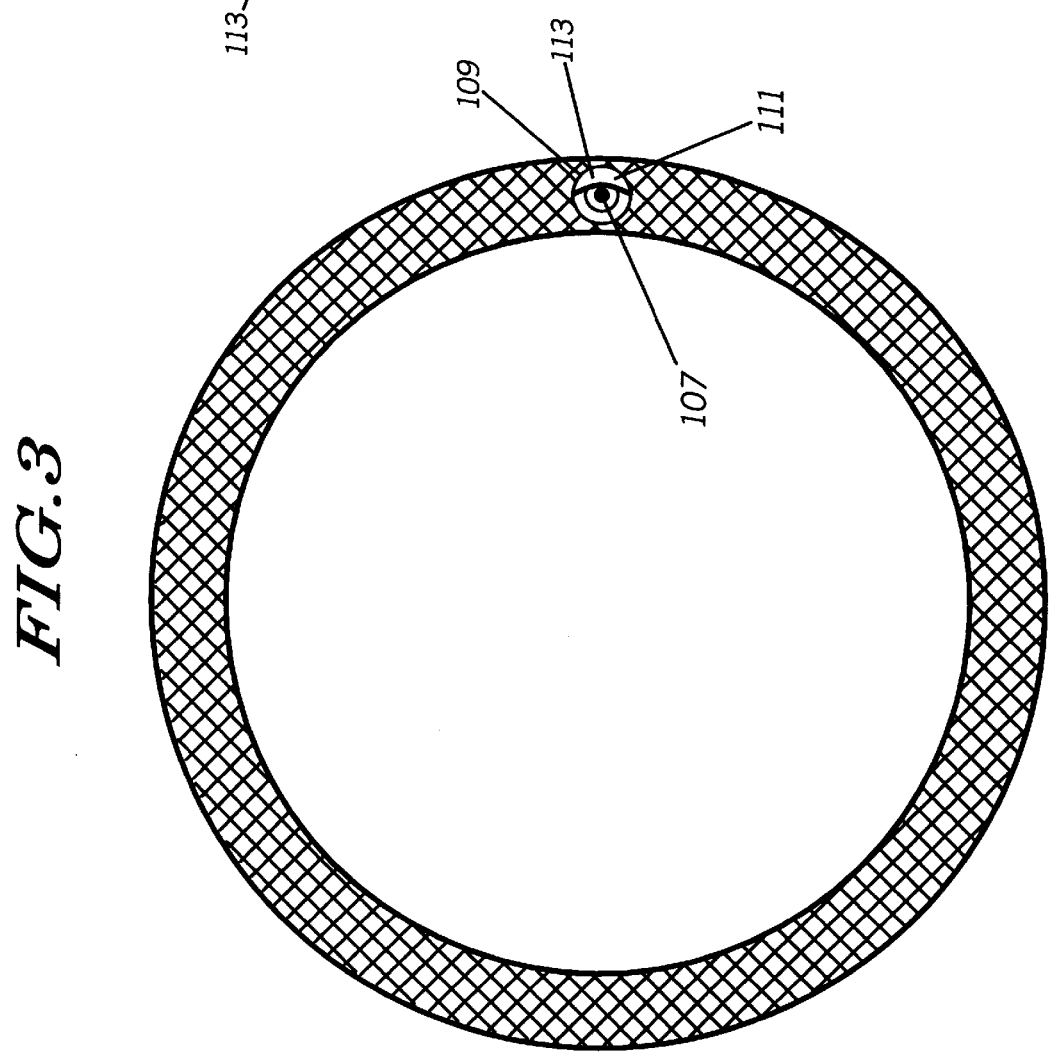

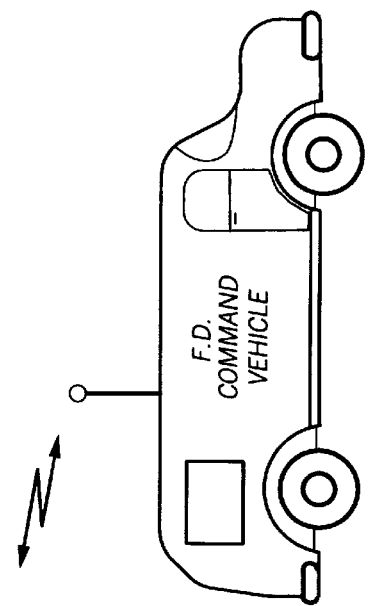
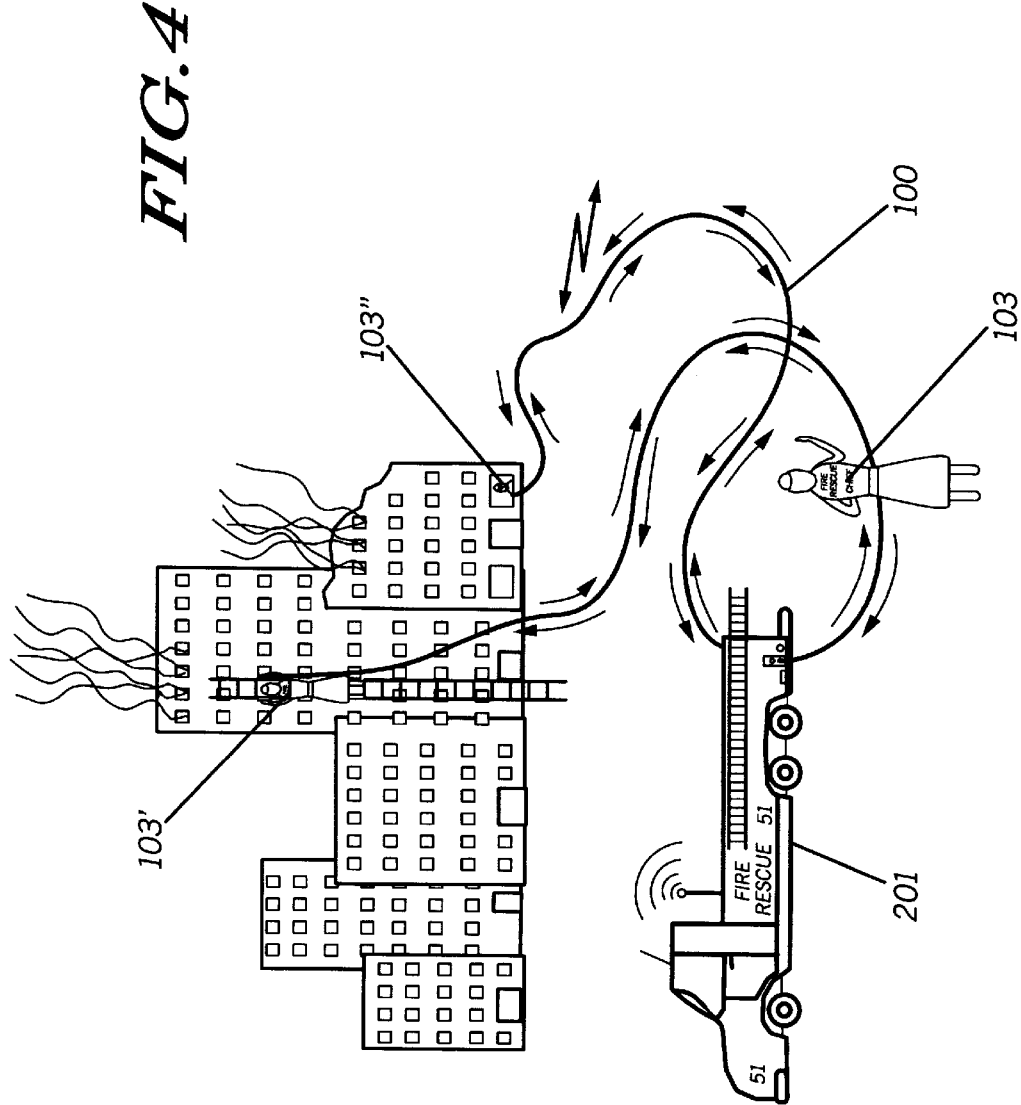
FIG. 4

FIRE HOSE INCLUDING AN INTEGRAL RADIATING ANTENNA

TECHNICAL FIELD

This invention relates in general to antennas and more particularly antennas used in firefighting applications.

BACKGROUND

Firefighters rely heavily on two-way radio communications while in an emergency. A firefighter often will be in a dangerous situation within an enclosed building and will depend on communication with others outside the building via portable two-way radio equipment. Depending on the size and construction of the building as well as power output and frequencies of the communications equipment, communications can become difficult due to radio frequency (RF) signal attenuation between those individuals inside and outside a building. This can be a big concern for the firefighter whose lifesaving efforts are dependent upon communicating with other firefighters in an emergency.

Thus, the need exists to provide an antenna system for increasing RF signal strength between those users inside and outside a building. This will insure highly reliable two-way radio communication between firefighters to increase safety and reduce the number of potential accidents due to firefighter location.

BRIEF DESCRIPTION OF THE DRAWINGS

FIG. 2 is a partial cross sectional view of the fire hose used to house the antenna conductor.

FIG. 3 is an end view of the fire hose showing the electrical conductor.

FIG. 4 is an alternative embodiment of the invention showing a rescue view used as a repeater for the integral antenna as seen in FIG. 1.

DETAILED DESCRIPTION OF THE PREFERRED EMBODIMENT

Figure 1:
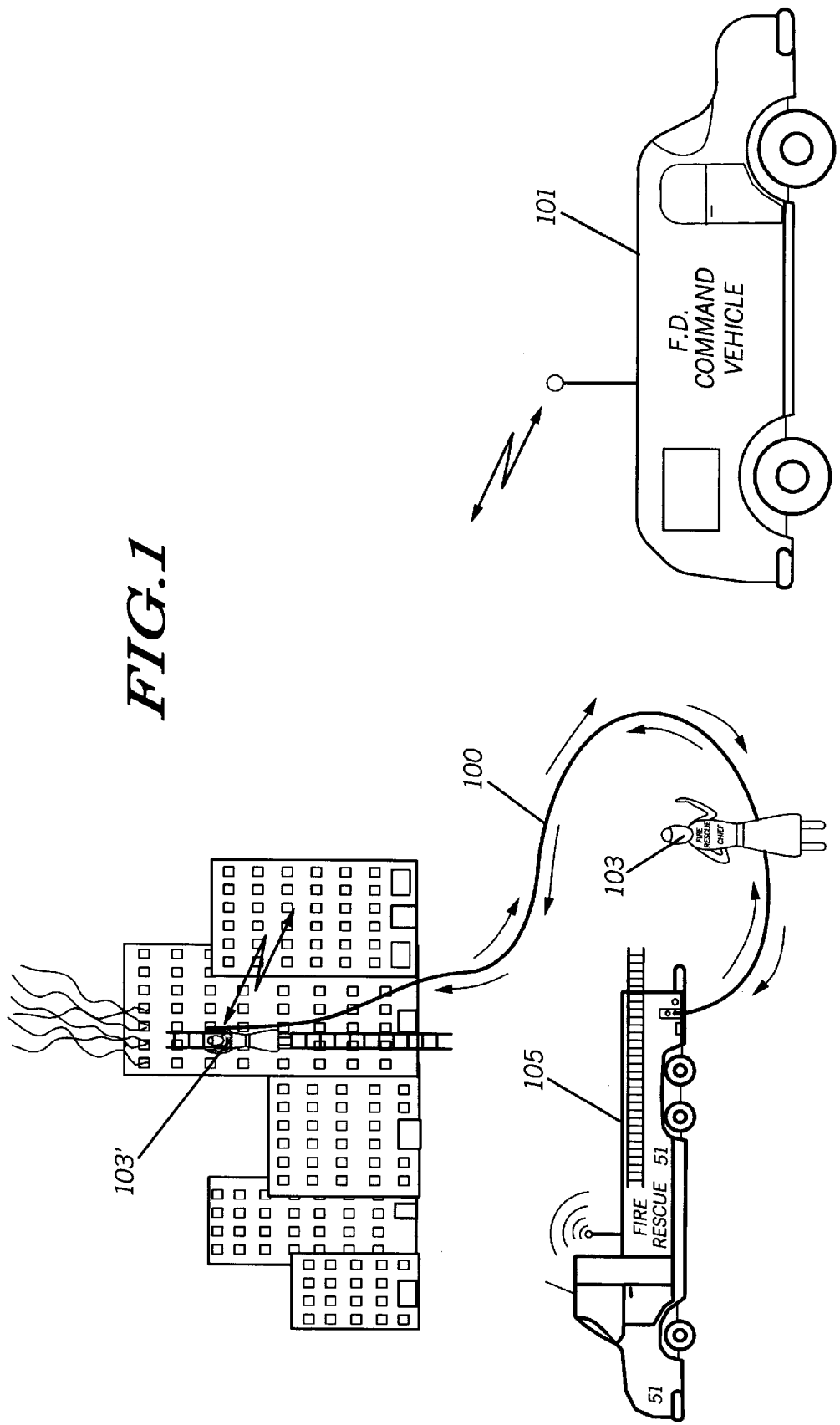
FIG. 1 is a diagram showing the fire hose having an integral antenna according to the preferred embodiment of the invention.

Referring now to FIGS. 1 through 3, there diagrams show the use of the integral fire hose antenna 100. Typically, a fire department unit may transmit and receive two-way radio frequency (RF) communications with a firefighter 103 or other fire rescue vehicles 104, 105. In some situations, a firefighter 103' may enter a building in which case direct RF communications could become unreliable due to degradation in RF signal strength.

In order to increase signal reliability and/or amplitude, the fire hose antenna 100 includes one or more electrical conductors 107 that act as a transmission line integrally disposed within a side wall of the fire hose. As is well known in the art, a fire hose is typically constructed of hybrid woven materials enabling it to carry water or other liquids under high pressure to a nozzle (not shown) or the like for extinguishing a fire. The hose is unique in that it is extremely durable yet can be completely collapsed under no pressure. This allows the hose to be rolled into a tight package for easy transport.

The electrical conductor 107 may be woven within the hose side wall and extends along the length of the fire hose. As will be evident to those skilled in the art, the electrical conductor 107 alternatively may extend only through a portion of the length of the fire hose. The electrical conductor 107 includes an insulator wall 109 and a shield 111 for isolating RF energy from the interior of the hose. The integral fire hose antenna 100 further includes one or more gaps or slots 113, in the shield 111 for exposing the electrical conductor 107. The slots 113 are separated by a predetermined distance and permit RF energy to enter and escape from the shield 111. This enables RF energy to be transmitted and/or received along the length of the fire hose that includes the electrical conductor 107. As is well known in the art, if the conductor 107 is greater than five wavelengths (5λ) of the operating frequency, no termination of the conductor 107 is necessary.

Thus, RF energy can propagate though the electrical conductor bi-directionally along the integral fire hose antenna 100. That energy received along the electrical conductor 107 as well as RF energy transmitted along the conductor 107 will move in either direction permitting enhanced communication to those persons using two-way radio communications equipment positioned along the length of the fire hose. As will be evident to those skilled in the art, the invention allows a firefighter 103' to enter the building and communicate with his two-way radio without any significant decrease in RF signal strength between those firefighters using two-way radio communication within the proximity of the hose.

With regard to FIG. 4, an alternative embodiment of the invention shows a rescue vehicle 201 used as a repeater and/or amplifier for the integral antenna 100 as seen in FIG. 1. In this embodiment, a firefighters 103, 103' and 103" can communicate along the entire length of the integral fire hose antenna 100 requiring a high reliability of communication and without the problems associated of RF signal degradation due to the firefighters physical location. In this way in an emergency, should a firefighter need assistance, any emergency message broadcast by the firefighter 103" or his two-way radio could easily be received by the firefighter 103 to dispatch the appropriate aid.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. A fire hose comprising:
   at least one conductor integrally woven into the fire hose wall and extending at least partially along a predetermined length;
   at least one slot located along the fire hose wall exposing the at least one conductor for transmitting and receiving radio frequency (RF) energy into the at least one conductor; and
   wherein RF energy is transmitted into the at least one conductor that is radiated through the at least one slot and RF energy is received through the at least one slot for receipt by a receiver positioned along the at least one conductor.

2. A fire hose used for carrying liquids to extinguish a fire comprising:
   at least one antenna feed line disposed integrally within a wall of the fire hose for conveying radio frequency (RF) energy from a first location to a second location;
   at least one slot in the at least one antenna feed line for transmitting and receiving RF energy therethrough; and wherein RF energy is transmitted through the at least one antenna feed line at the first location and radiated through the at least one slot at the second location and RF energy is received through the at least one slot at the second location and received by a receiver at the first location.

3. A fire hose as in claim 2 wherein the hose is constructed of a flexible woven material.

4. A fire hose as in claim 2 wherein the at least one slot is positioned at one end of the at least one antenna feed line.

5. A fire hose as in claim 2 wherein a plurality of slots are positioned along the at least one antenna feed line at predetermined distances.

6. A method of transmitting radio frequency (RF) energy from a first location to at least one second location using a fire hose comprising the steps of:

integrating at least one conductor into a side wall of a fire hose;

exposing the at least one conductor through side wall using a slot; and transmitting and receiving RF energy from the first location to the at least one second location along the at least one conductor through the slot for increasing RF signal amplitude and communications reliability.

7. A method of transmitting RF energy as in claim 6 further including a plurality of slots located a predetermined locations along the at least one conductor for allowing the entry and escape of RF energy from the at least one conductor.

* * * * *